June 30, 1936. K. J. E. HESSELMAN 2,046,263
INTERNAL COMBUSTION ENGINE
Original Filed Sept. 30, 1930 3 Sheets-Sheet 1

INVENTOR
Knut Jonas Elias Hesselman
BY
his ATTORNEY

June 30, 1936.  K. J. E. HESSELMAN  2,046,263
INTERNAL COMBUSTION ENGINE
Original Filed Sept. 30, 1930  3 Sheets-Sheet 2

INVENTOR
BY
his ATTORNEY

June 30, 1936.   K. J. E. HESSELMAN   2,046,263
INTERNAL COMBUSTION ENGINE
Original Filed Sept. 30, 1930   3 Sheets-Sheet 3

INVENTOR
Knut Jonas Elias Hesselman
BY
his ATTORNEY

Patented June 30, 1936

2,046,263

UNITED STATES PATENT OFFICE 2,046,263

INTERNAL COMBUSTION ENGINE

Knut Jonas Elias Hesselman, Saltsjo-Storangen, Sweden, assignor to Hesselman Motor Corporation, Ltd., London, England, a corporation of Great Britain Application September 30, 1930, Serial No. 485,378. Renewed March 27, 1934. In Sweden October 17, 1929

12 Claims. (Cl. 123—32)

The present invention relates to internal combustion engines and has particular reference to engines operating on liquid fuel which is injected directly into the combustion chamber in one or more jets by means of an injection nozzle and is ignited by electric ignition means.

In engines of this type the fuel enters the combustion chamber in jet form as a finely divided or atomized spray which is spread to a greater or less extent by the action of the injecting nozzle, and the igniting device, which is ordinarily in the form of a spark plug is located in such a position with reference to the fuel jet that the spark occurs adjacent to the outer edge or zone of the jet. It is, however, practically, a difficult matter to maintain the direction of the jet of fuel constant, since a very slight impurity in the fuel, or minor clogging or misalignment of the nozzle may change the direction of the jet sufficiently so that the electrodes of the plug, instead of being adjacent to the outer zone of the jet, are either too far toward the central portion of the jet or entirely away from any part of it. In the former case, ignition may fail because of wetting of the plug by the fuel or because of cooling of the fuel due to contact with the plug, and in the latter case ignition may fail due to the lack of a combustible charge at the point where the spark occurs.

The general purpose of the present invention is to eliminate the above mentioned difficulties heretofore encountered in the operation of such engines, and to provide a novel arrangement of fuel feeding and igniting elements insuring dependable ignition of the fuel charge. This object is accomplished by protecting the igniting device against direct injection of fuel thereagainst, and at the same time by so locating it that a part of the fuel, after leaving the injection nozzle and being mixed with the combustion air, may easily reach the zone in which the igniting spark occurs.

In accordance with the invention the igniting device is protected from direct impingement of fuel thereagainst by placing it in a pocket opening into the combustion chamber, one wall of the pocket providing a shield interposed between the igniting device and fuel nozzle. As will more clearly appear hereinafter the pocket for the igniting device may be either in the form of a recess in a part of the wall surface of the combustion chamber, or may be formed by the part of the combustion chamber proper situated on the side opposite the fuel nozzle of a projection extending into the combustion chamber and providing the desired shielding means.

The shield means is fixed with respect to the igniting device and is situated with relation to the igniting device and to the fuel opening in the injection nozzle so that the igniting device lies outside the projection of a line drawn from the opening in the injection nozzle to the inner edge of the means forming the shield.

The invention is applicable to different specific types of engines, and may be carried into effect in a number of different ways. For a more complete understanding of the nature of the invention and the more detailed objects thereof, reference may therefore best be had to the following description of several different examples of engines embodying the invention, which are illustrated in the accompanying drawings forming a part of the specification.

Figure 1:
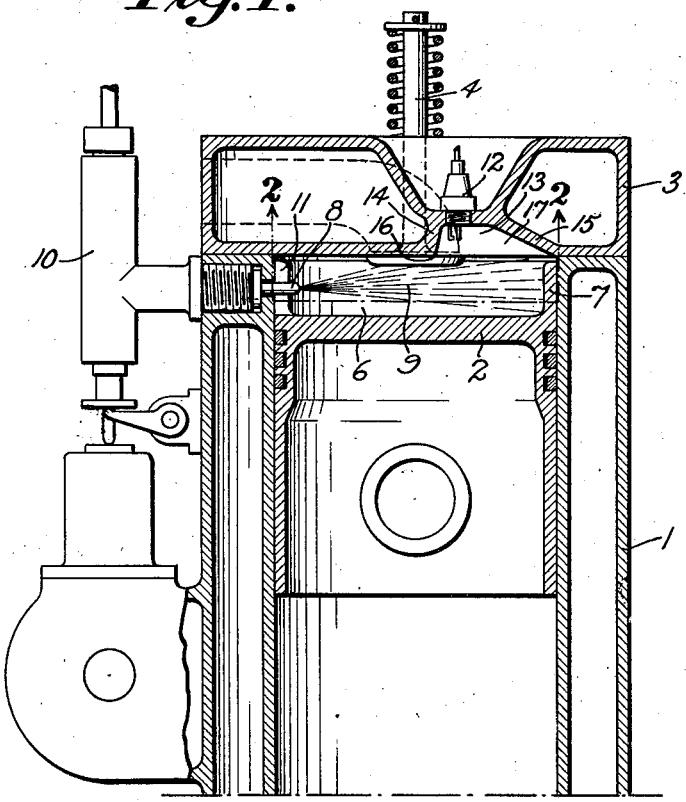
Fig. 1 is an axial section through the cylinder of an engine embodying the invention.

Turning now to Fig. 1, reference character 1 indicates the cylinder, 2 the piston and 3 the cylinder head of a typical form of valve-in-head engine. In the form illustrated the cylinder and the head are separate elements, but the entire cylinder including the head may be an integral unit, and hereinafter when the term cylinder head is used it is intended to include both separate and integral heads.

The cylinder head has mounted therein the usual valves 4 and 5, and the combustion chamber 6 in the engine shown is formed between the head and the piston 2, the latter being provided with a peripheral flange which in the upper position of the piston serves to form the side walls of the combustion chamber. Liquid fuel is injected transversely of the combustion chamber through a nozzle 8 mounted in the side wall of the cylinder, this nozzle projecting one or more spread jets 9 of fuel. Nozzle 8 is supplied with fuel from the pump 10, which may advantageously be of the plunger type. A slot 11 is provided in flange 7 to accommodate the nozzle 8 when the piston is in its upper position.

In the type of engine illustrated the fuel is injected into the combustion chamber during the latter part of the compression stroke. The igniting device, which in the illustrated form consists of a spark plug 12, is mounted in the cylinder head 3 and is situated in a pocket which in the present instance is in the form of a recess 13, said recess having a shielding wall 14 between the plug 12 and the nozzle 8 and an opposite wall 15. As will be noted from the figure, wall 14 lies substantially normal to the center line of jet 9, the lower or inner edge 16 of this wall being located with respect to the plug and the nozzle so that the plug lies outside the projection of a line drawn from the opening in the nozzle to this edge. It will further be observed that the electrodes of plug 12 are placed adjacent to the shielding wall 14, whereas the wall 15 provides a relatively open space 17 on the side of the plug away from nozzle 8. For purposes of convenience this space 17 will be considered as being behind the plug, and the wall 14 and edge 16 as being in front of the plug. The terms inside and outside, as applied to the location of the plug, the shielding wall and the edge thereof, will hereinafter be used to designate the relation of these parts with respect to the central part of the combustion chamber.

Figure 2:
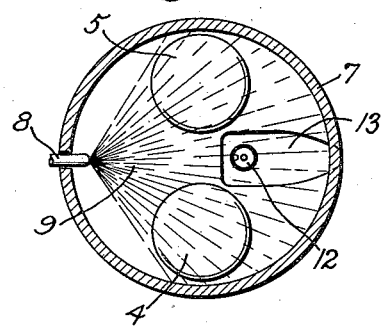
Fig. 2 is a section taken on the line line 2—2 of Fig. 1 illustrating the application of the invention with one form of injection nozzle.
Figure 3:
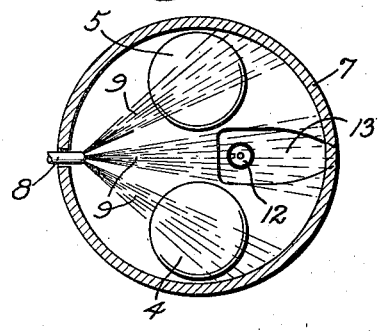
Fig. 3 is a section similar to Fig. 2 and illustrating the application of the invention with another form of nozzle.

Referring to Fig. 2 the above described arrangement is shown with a nozzle projecting a single jet of fuel which is widely spread across the section of the combustion chamber, whereas in Fig. 3 a nozzle projecting three separate and relatively narrow jets is illustrated. In an arrangement where more than one fuel jet is employed, at least one of the jets should be projected so that the fuel therefrom can be carried into the pocket in which the spark plug is located, preferably by projecting it across the opening of the pocket.

In operation the fuel is projected past the opening of pocket 13 and, as may readily be seen, there is no opportunity for fuel to be directly projected against any part of the spark plug. During the period of injection the piston is moving upwardly compressing the combustion air in the cylinder, and there is consequently not only a certain amount of turbulence within the cylinder but also an upward movement of the air in the cylinder, which movement decreases as the piston approaches its upper dead center. This movement of the air causes mixing of the most finely divided or atomized particles of fuel with combustion air which mixing is facilitated adjacent to the plug by the provision of space 17 in pocket 13. It will thus be seen that the above described arrangement effectually prevents wetting of the spark plug by direct impingement of the fuel thereon and also provides reliable means for insuring the presence of a combustible mixture at the point where the spark occurs. These objects are accomplished even though the direction of the center line of the fuel jet varies because of fuel impurities or from any other cause, since if the jet is directed further upwardly than indicated in the figure, the lower edge 16 of the shielding wall continues to protect the plug, and if the fuel is projected downwardly so that the jet is somewhat further away from pocket 13 than indicated in the figure, the air movement in the cylinder will still operate to carry the finely divided fuel particles into space 17 where a combustible mixture will be formed.

Figure 4:
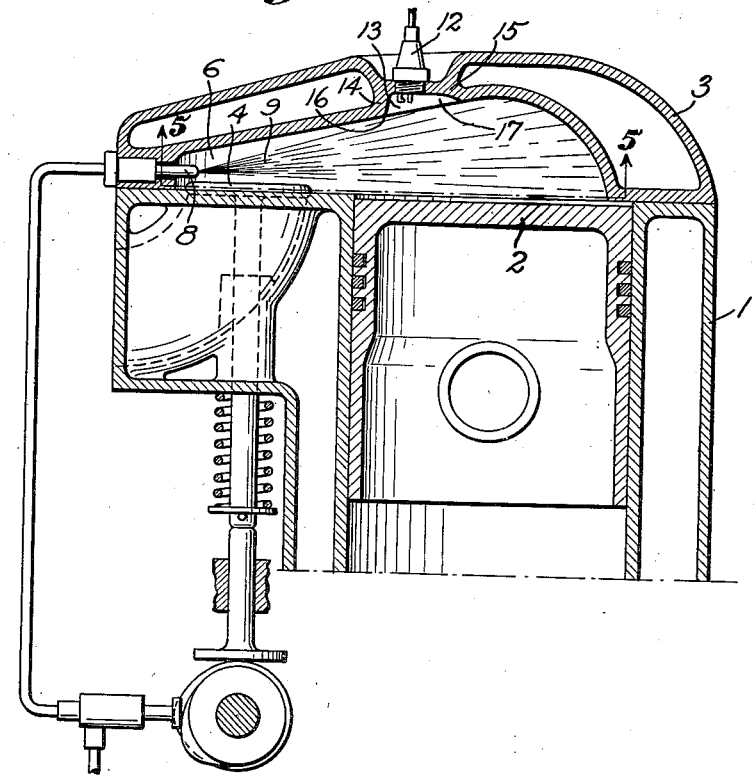
Fig. 4 is a section similar to Fig. 1 and illustrating the application of the invention to another form of engine.
Figure 5:
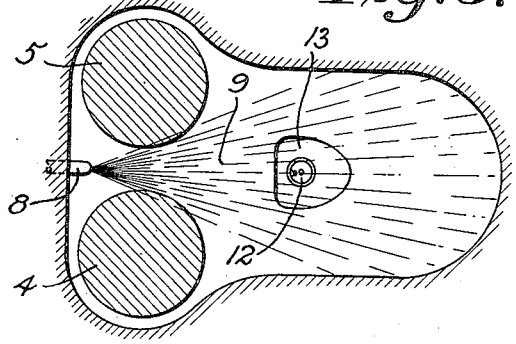
Fig. 5 is a section taken on the line 5—5 of Fig. 4.

Figs. 4 and 5 illustrate the invention as applied to an L-head engine with the valves placed at the side of the cylinder. In this form of engine the combustion chamber 6 is formed within the head and extends laterally over the valves 4 and 5. Nozzle 8 is situated in the side wall of the combustion chamber between the valves and projects a spreading jet of fuel transversely of the combustion chamber, the height of the latter increasing with the distance from the nozzle.

A pocket 13, which is again in the form of a recess, is formed in the upper or top wall of the combustion chamber, and in this pocket is located the plug 12. Plug 12 is situated in the pocket in the same manner as previously described, that is, with the electrodes closely behind the inner edge 16 of wall 14 and outside the projection of a line drawn from the nozzle opening to said edge 16. The conformation of wall 15 is such that a space 17 is provided behind the plug electrodes, which forms a mixing chamber functioning in the manner already described.

Figure 6:
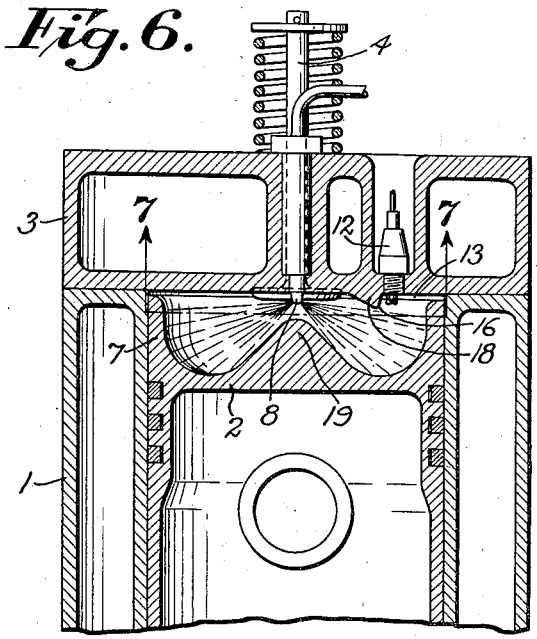
Fig. 6 is a section similar to Fig. 1 illustrating the invention as applied in still another form of engine.
Figure 7:
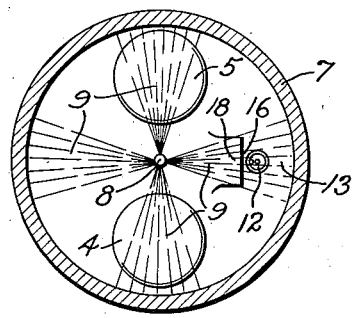
Fig. 7 is a section taken on the line 7—7 of Fig. 6.
Figure 8:
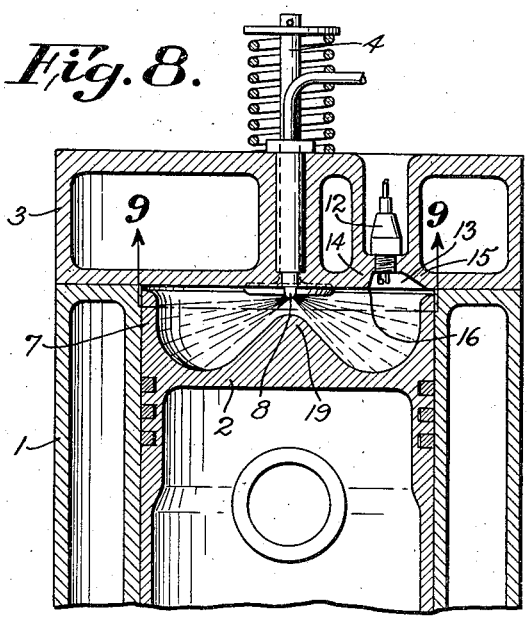
Fig. 8 is a section similar to Fig. 6 illustrating a modification of the arrangement shown in Fig. 6.
Figure 9:
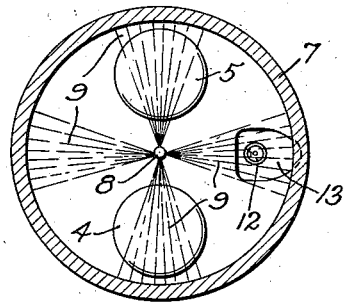
Fig. 9 is a section taken on the line 9—9 of Fig. 8.

In Figs. 6 to 9, the invention is shown as applied to an engine of the valve-in-head type, but different from the form illustrated in Fig. 1 in that the fuel is injected radially into the combustion chamber through a nozzle 8 mounted in the head and extending into the center of the combustion chamber. This nozzle may project a plurality of jets 9, as shown in Figs. 7 and 9.

In the form of construction shown in Fig. 6 the pocket 13 is not in the form of a recess in the head but is formed by providing, between plug 12, which is situated radially to one side of nozzle 8, and the nozzle, an inwardly extending projection 18, forming a shielding wall in front of the plug. The inner edge 16 of the projection 18 is, as in the previously described arrangements, located with respect to the plug and the nozzle so that the plug lies outside the projection of a line drawn from the nozzle opening to the edge 16. In the present form of construction it will be noted that the portion of the pocket 13 lying behind the plug provides a space 17 for the formation of a combustible mixture.

In Fig. 8, which in other particulars is like Fig. 6, the pocket 13 is made by forming a recess in the head, the front wall 14 of the recess being situated with respect to the plug and the nozzle so that the electrodes of the plug lie outside the projection of a line drawn from the nozzle opening to the inner edge 16 of wall 14. Wall 15, behind the plug, lies at an acute angle to the center line of the jet passing the pocket, and provides the desired space 17 immediately behind the plug.

In Figs. 6 and 8, where central injection is employed, the piston 2 is shown in the form having a peripheral flange 7 and a central projection 19, which form produces a combustion chamber in the shape of a torus. It is evident, however, that insofar as the present invention is concerned, other forms of piston may be employed.

From the foregoing description of various embodiments of the invention it will be evident that numerous other specific forms and arrangements may be employed without departing from the spirit of the invention, and that the invention may be applied in engines using a plurality of plugs and nozzles per cylinder in addition to engines of the type illustrated, in which only one plug and nozzle per cylinder are employed.

What I claim is:

1. In an internal combustion engine of the type in which ignition during normal operation of the engine is effected by electric spark, a cylinder and a cylinder head providing a combustion chamber, a nozzle having an opening for projecting a jet of liquid fuel during the latter part of the compression stroke transversely of the cylinder adjacent to the upper wall of said chamber, said head providing a relatively shallow and open pocket communicating with the combustion chamber, a spark plug located in said pocket for igniting fuel from said jet, said pocket having a shielding wall and said spark plug being located adjacent to said wall and outside of and adjacent to the projection of a line drawn from the opening in said nozzle to the inner edge of said wall.

2. An internal combustion engine of the type in which ignition during normal operation of the engine is effected by electric spark comprising a cylinder, a head for said cylinder and forming therewith a combustion chamber, a nozzle mounted in the side of the cylinder and having an opening for projecting a jet of liquid fuel during the latter part of the compression stroke transversely of the cylinder adjacent to the upper wall of the combustion chamber, said head providing a relatively shallow and open recess communicating with the combustion chamber and offset with respect to the center line of the jet, a spark plug located in said recess for igniting fuel from said jet, said recess having a shielding wall between the spark plug and the nozzle, and said spark plug being located outside of and adjacent to the projection of a line drawn from the opening in said nozzle to the inner edge of said wall.

3. In an internal combustion engine of the type in which ignition during normal operation of the engine is effected by electric spark, a cylinder, a head for said cylinder, said head providing a combustion chamber having a recess communicating therewith, a nozzle for projecting a jet of liquid fuel during the latter part of the compression stroke transversely of said chamber adjacent to and across the open side of said recess, and a spark plug located in the recess adjacent to the front wall thereof, said spark plug constituting the sole means for ignition during continuous normal operation of the engine and said recess providing a relatively open space behind the spark plug.

4. In an internal combustion engine of the type in which ignition during normal operation of the engine is effected by electric spark and having a combustion chamber, a nozzle having an opening for projecting liquid fuel during the latter part of the compression stroke into said chamber, a spark plug for igniting fuel in said chamber upon each working stroke during continuous normal operation of the engine, means fixed with respect to the spark plug for providing a shield between the same and the nozzle, the spark plug being located outside and adjacent to the projection of a line drawn from the opening in the nozzle to the inner end of the shielding means.

5. In an internal combustion engine of the type in which ignition during normal operation of the engine is effected by electric spark and having a combustion chamber, a piston in communication with said chamber, a nozzle having an opening for projecting liquid fuel during the latter part of the compression stroke into said chamber, a spark plug for igniting fuel in said chamber upon each working stroke during continuous normal operation of the engine, means fixed with respect to the spark plug for providing a shield between the same and the nozzle, the spark plug being located outside and adjacent to the projection of a line drawn from the opening in the nozzle to the inner end of the shielding means and there being a relatively open space behind said spark plug and confronting the piston.

6. In an internal combustion engine of the type in which ignition during normal operation of the engine is effected by electric spark and having a combustion chamber, means providing an open pocket in communication with said chamber, a fuel injecting nozzle projecting a jet of finely divided liquid fuel during the latter part of the compression stroke transversely across and adjacent to the open side of the pocket, said pocket being formed and arranged to prevent direct injection of fuel thereinto, and means for igniting the injected fuel on each working stroke of the engine during continuous normal operation comprising a spark plug located in said pocket.

7. In an internal combustion engine of the type in which ignition during normal operation of the engine is effected by electric spark and having a combustion chamber, an engine cylinder, a piston, means providing an open pocket in the combustion chamber wall confronting the piston, a fuel injecting nozzle for projecting a jet of finely divided liquid fuel during the latter part of the compression stroke transversely across and adjacent to the open side of the pocket, said pocket being formed and arranged to prevent direct injection of fuel thereinto, and means for igniting the injected fuel on each working stroke of the engine during continuous normal operation comprising a spark plug located in said pocket so that the point of ignition is adjacent to the open side of the pocket.

8. In an internal combustion engine of the type in which ignition during normal operation of the engine is effected by electric spark and having a combustion chamber, a nozzle having an opening for projecting a jet of liquid fuel during the latter part of the compression stroke into said chamber, means providing a pocket communicating with said chamber and offset from the center line of the jet and a spark plug situated in said pocket, said pocket having a shielding wall located in front of the spark plug and an opposite wall behind the spark plug, the angle between said opposite wall and the center line of the jet and including said pocket being acute, said spark plug being located outside of the projection of a line drawn from the opening of said nozzle to the inner edge of said first named wall.

9. In an internal combustion engine of the type in which ignition during normal operation of the engine is effected by electric spark and comprising a cylinder having a head and a piston, said cylinder and piston providing a combustion chamber, a spark plug situated in the cylinder head above said piston, means for injecting a jet of finely divided liquid fuel during the latter part of the compression stroke transversely of said combustion chamber between said plug and said piston and adjacent to the wall of the combustion chamber provided by said head and adjacent to the point of ignition provided by said plug, whereby a mixture of fuel and air from said jet is carried to the vicinity of said point of ignition due to axial movement of air in the combustion chamber toward the head of the cylinder due to movement of the piston on the compression stroke, and means fixed with respect to said plug for preventing direct impingement of fuel from said jet against said plug.

10. In an internal combustion engine of the injection type in which ignition is effected by electric spark and including a cylinder and a piston providing a combustion chamber, a nozzle having an opening for injecting a jet of finely divided liquid fuel transversely of said combustion chamber during the latter part of the compression stroke, a spark plug located in said chamber so that the spark produced thereby occurs adjacent to the outer edge of said jet including a part which if wet by unatomized fuel would cause the spark gap of the plug to be short circuited and means for protecting said part from direct impingement thereon of improperly atomized fuel injected through said opening.

11. In an internal combustion engine of the injection type in which ignition is effected by electric spark and including a cylinder and a piston providing a combustion chamber, a nozzle having an opening for injecting a straight jet of finely divided liquid fuel transversely of said combustion chamber during the latter part of the compression stroke, a spark plug located in said chamber at a substantial distance from said opening and so that the spark occurs adjacent to the outer edge of said jet including a part which if wet by unatomized fuel would cause the spark gap of the plug to be short circuited and means for protecting said part from direct impingement thereon of improperly atomized fuel injected through said opening.

12. In an internal combustion engine of the injection type in which ignition is effected by electric spark and including a cylinder and a piston providing a combustion chamber, a nozzle having an opening for injecting a straight jet of finely divided liquid fuel transversely of said combustion chamber during the latter part of the compression stroke, a spark plug located in said chamber at a substantial distance from said opening and with its axis transverse to the general direction of the fuel jet including a part which if wet by unatomized fuel would cause the spark gap of the plug to be short circuited and means for protecting said part from direct impingement thereon of improperly atomized fuel injected through said opening.

KNUT JONAS ELIAS HESSELMAN.